Feb. 27, 1968  P. NARBUT  3,371,298
COOLING SYSTEM FOR ELECTRICAL APPARATUS
Filed Feb. 3, 1966  2 Sheets-Sheet 1
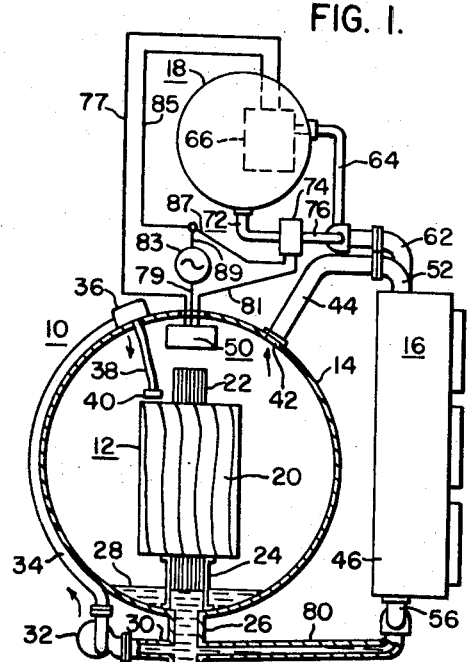
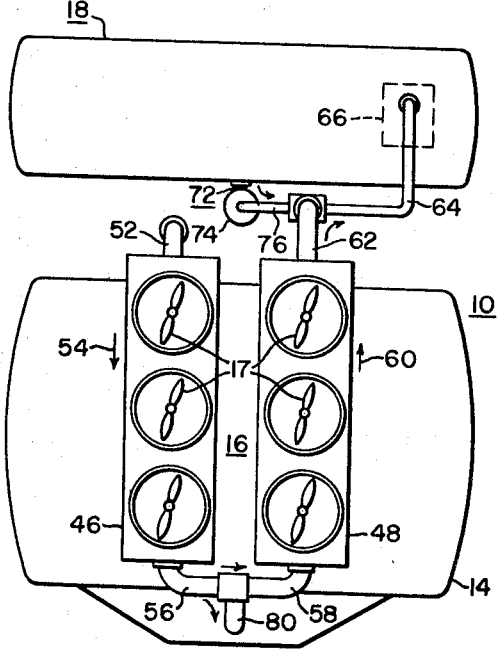
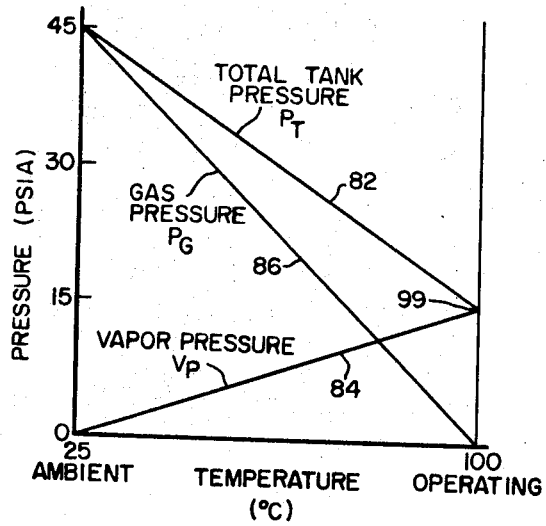
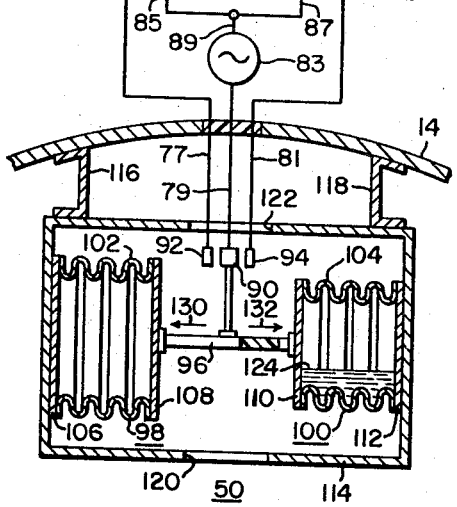
WITNESSES:
John L. Chopp
James F. Young
INVENTOR
Paul Narbut
BY Donald R. Lackey
ATTORNEY _United States Patent Office_

3,371,298
Patented Feb. 27, 1968

3,371,298
COOLING SYSTEM FOR ELECTRICAL APPARATUS
Paul Narbut, Hickory Township, Sharpsville, Pa., assignor to Westinghouse Electric Corporation, Pittsburgh, Pa., a corporation of Pennsylvania
Filed Feb. 3, 1966, Ser. No. 524,676
9 Claims. (Cl. 336—57)

ABSTRACT OF THE DISCLOSURE

An electrical transformer which is cooled and electrically insulated by a vaporizable liquid and a non-condensable gas. Temperature and pressure responsive sensor means is disposed to control the amount of non-condensable gas in the transformer tank. When the transformer temperature is below that which is required to evaporate a sufficient quantity of the liquid to fill the tank with vapor, the windings of the transformer are insulated with the non-condensable gas at a predetermined elevated pressure. As the transformer temperature increases towards its normal operating temperature, the non-condensable gas is removed from the tank at a predetermined rate which is responsive to the temperature and pressure within the tank, to reduce the total tank pressure with increasing temperature along a predetermined curve. Once the operating temperature is reached, the sensor means regulates the tank pressure. When the temperature of the transformer starts to drop, the sensor means adds non-condensable gas to the tank in response to the temperature and pressure within the tank.

---

This invention relates in general to electrical apparatus, such as transformers, and more particularly to electrical inductive apparatus which utilizes a fluid dielectric atmosphere for cooling and electrical insulating purposes.

A highly efficient arrangement for cooling electrical apparatus includes the use of a relatively small amount of liquid cooling means which is vaporizable at the normal operating temperatures and pressures of the electrical apparatus. The liquid cooling means is sprayed, or otherwise applied over the electrical windings of the apparatus and associated magnetic core. The liquid vaporizes as it absorbs heat generated in the windings and magnetic core, providing electrical insulation for the windings under certain operating conditions, as will hereinafter be explained.

When the electrical apparatus is at room temperature the vapor pressure of the liquid cooling means is low, and the amount of vapor within the casing or tank which surrounds the electrical windings is insufficient to provide adequate electrical insulation when the transformer is initially energized or when it is operating at very light loads. Therefore, a gaseous insulating dielectric, which is non-condensable at the normal operating temperatures and pressures of the electrical apparatus, is used to provide the electrical insulating strength required by the electrical windings when the vapor pressure is low.

The electrical insulating strength of suitable non-condensable gases and vapors increases with pressure. Further, at equal pressures, the dielectric strength of the coolant vapors is superior to that of suitable non-condensable gases. Therefore, to obtain equivalent insulation levels with gas and vapor insulation, it is usually necessary that the gas pressure, at the lower temperatures, be relatively high. As the electrical apparatus heats due to current flowing in the electrical windings, and heat developed in any magnetic core means associated with the electrical windings, it becomes desirable to remove the non-condensable gas from the tank at a predetermined rate, until when at the desired operation temperature of the apparatus, the tank becomes filled only with vapor provided by the vaporizable coolant, at a pressure sufficient to obtain the desired insulation level of the apparatus.

There are several reasons why it is desirable to remove the non-condensable gas as the apparatus heats from ambient to the desired operating temperature. For example, it is desirable to control the total tank pressure and prevent it from building up to undesirable magnitudes as the vapor pressure of the vaporizable liquid coolant increases. Since the electrical insulating strength of the condensable vapors, for any given pressure, is much greater than suitable non-condensable gaseous dielectrics, it is desirable to reduce the tank pressure from the elevated initial pressure of the tank at ambient temperature to a predetermined lower pressure when the tank is at operating temperature and contains only the vapors of the liquid vaporizable coolant. The pressure of the tank at operating temperature is determined by the lowest pressure at which the vapors will provide adequate insulation strength, and is determined by the maximum temperature which the insulation system of the electrical apparatus is designed to withstand. For example, if it is desirable to control the temperature of the tank of the electrical apparatus to a boiling point of the liquid coolant at atmospheric pressure, the pressure of the tank should follow a predetermined curve from its elevated value at ambient temperature to atmospheric pressure at its desired operating temperature.

Another reason for removing the non-condensable gas from the casing or tank of electrical apparatus as the vapor pressure of the tank and its temperature increases, is to prevent the non-condensable gas from interfering with the heat transfer by condensation of the coolant vapors on the cooling surfaces inside the tank and in the cooling means. It is well known to those skilled in the art that even a small amount of non-condensable gas that may be present reduces the high cooling efficiency of the vaporization-condensation process, therefore requiring either a higher operating temperature of the windings or larger, and hence more costly, cooling means. Therefore, for maximum cooling efficiency at operating temperature, the tank should only include the cooling liquid and its vapors.

It is not the mere removal of the non-condensable gas from the tank of the electrical apparatus that is desired. It is the controlled removal and reintroduction of the non-condensable gas to a closed system that is required in response to predetermined temperature and pressure conditions in the transformer tank. The control means should prevent undesirably high pressures and undesirably high temperatures within the tank of the electrical apparatus under variable load conditions while maintaining a substantially uniform insulation level for the electrical windings of the apparatus.

Accordingly, it is an object of the invention to provide a new and improved electrical apparatus which includes a non-condensable gas and a vaporizable liquid coolant disposed within an enclosure, and means for controlling the pressure and temperature within the enclosure in a predetermined manner as the electrical apparatus is operated over the temperature range of ambient to a predetermined operating temperature.

Another object of the invention is to provide a new and improved transformer of the type which is cooled by a vaporizable liquid coolant, insulated by the vapors of the vaporizable coolant when at a predetermined operating temperature, and at least partially insulated by a non-condensable gas when the transformer is below the predetermined operating temperature, and including means for controlling the pressure and temperature of the transformer between ambient and the predetermined operating temperature.

A further object of the invention is to provide means responsive to the temperature and pressure conditions of condensable and non-condensable fluid insulated and cooled electrical apparatus which causes the electrical apparatus to be operated over a predetermined pressure curve between ambient and operating temperatures.

Still another object of the invention is to provide a new and improved fluid cooled transformer which uses a vaporizable liquid to cool the transformer, the vapor of the liquid coolant to insulate the transformer at operating temperature, and a non-condensable gas to insulate the transformer at temperatures below the operating temperature, and including means responsive to the pressure and temperature of the transformer between ambient and operating temperatures to control the total pressure of the transformer in a predetermined manner with temperature, and responsive to the pressure of the transformer at operating temperatures to maintain a predetermined pressure in the transformer.

Briefly, the present invention accomplishes the above cited objects by providing a transformer having electrical windings disposed in a tank, heat exchanger means, and a storage tank. The transformer is cooled by a vaporizable liquid coolant which is applied over the windings and magnetic core. When the temperature of the windings and magnetic core is below the temperature required to evaporate a sufficient quantity of the liquid to fill the tank with vapors, the windings are insulated with a non-condensable gas, which is at a predetermined pressure above atmospheric at ambient temperature. As the winding temperature increases, which increases the partial pressure in the tank due to the vapor, the non-condensable gas is removed from the tank through the heat exchanger means, and into the storage tank, at a predetermined rate responsive to the temperature and pressure within the tank, to reduce the total tank pressure with increasing temperature along a predetermined curve.

When all of the non-condensable gas is removed from the tank, if the load is sufficiently high, the hot vapor will partially fill the heat exchanger means under dynamic equilibrium condition. The portion of the heat exchanger means in contact with the hot vapors will be an effective cooling surface. The remainder of the heat exchanger means will be blanketed by the non-condensable gas and takes no part in the cooling process. The heat exchanger means is designed such that from a predetermined minimum load to the maximum load, the boundary line between the vapors of the liquid coolant and the non-condensable gas will fall within the length of the heat exchanger means.

In order to control the pressure within the transformer tank according to the tank pressure and temperature when the transformer temperature is between ambient and a predetermined operating temperature, and in order to control the pressure within the tank according to pressure alone once the predetermined operating temperature is reached, sensor means is used to control a compressor and expansion valve. The compressor is used to remove the non-condensable gas and compress it into the storage tank, while the expansion valve is used to return the non-condensable gas back to the transformer tank in response to signals from the sensor means.

In one embodiment of the invention, the sensor means is disposed within the transformer tank at a predetermined location, preferably near the top of the tank. The sensor means comprises first and second pressure responsive means having first and second pressure areas which translate a change in pressure to an axial movement. The first and second pressure responsive means may be first and second bellows, or diaphragms, such as the sylphon type bellows. The bellows are coaxially disposed in spaced relation with their pressure areas adjacent to and parallel with one another. A rod-like member is disposed to extend between and to be secured to the pressure areas of the first and second bellow means. The rod member moves axially in response to any unbalance of forces applied to the rod by the first and second bellow means. The rod-like member cooperates with first and second electrical contacts, to close the first contact when the unbalance of forces moves the rod in a first direction, and to close the second electrical contact when the unbalance of forces moves the rod in the opposite direction. The first electrical contact is connected to energize the compressor when its contacts are closed, to remove non-condensable gas from the heat exchanger and tank, and the second electrical contact is connected to open an expansion valve when the second electrical contacts are closed, to allow the non-condensable gas to escape from the storage tank back into the heat exchanger and tank.

In order to obtain the desired operation of the sensor means, the first bellows may contain a non-condensable gas, and the second bellows may contain a vaporizable liquid coolant and a non-condensable gas. The areas of the pressure bases or plates of the first and second bellows is selected to have a predetermined relationship. While the tank contains both non-condensable gas and vapor, the pressure and temperature in the tank will both change and the sensor means will respond to both the temperature and pressure changes. The unequal areas of the pressure bases of the first and second bellows makes the sensor respond to pressure changes, and the vaporizable liquid in the second bellows makes the sensor respond to temperature changes at the particular location selected within the tank. Once the non-condensable gas is removed completely from the tank, and the vapor partially fills the heat exchanger means, the sensor means will become only pressure responsive. Under this condition the temperature in the tank will be limited to the boiling point of the vaporizable liquid at the particular tank pressure.

The ratio of the areas of the pressure bases of the second bellows is selected to balance the position of the rod-like member, and thus insure that both the first and second electrical contacts are open when the pressure and tank temperature reach predetermined operating points. In other words, at equilibrium, or balance of the forces applied by the first and second bellow means to the rod-like member, the pressure in the first bellows due to the non-condensable gas, relative to the tank pressure on its pressure plate, produces a force on the rod member which is equal to and opposite to the force on the rod member produced by the pressure in the second bellows due to the pressure of the non-condensable gas and the vapor pressure of the vaporizable liquid, relative to the tank pressure on its pressure plate.

The invention also discloses other embodiments of the sensor means wherein the sensor means may be disposed external to the casing of the electrical apparatus.

Further objects and advantages of the invention will become apparent from the following detailed description taken in connection with the accompanying drawings, in which:

FIGURE 1 is a side elevational view, partially in section, of a transformer constructed according to the teachings of the invention;

FIG. 2 is a front elevational view of the transformer shown in FIG. 1;

FIG. 3 is a graph illustrating typical operating conditions of a transformer constructed according to the teachings of the invention;

FIG. 4 is an elevational view, in section, of sensor means constructed according to a first embodiment of the invention, which may be used with the transformer shown in FIGS. 1 and 2;

Figure 5:
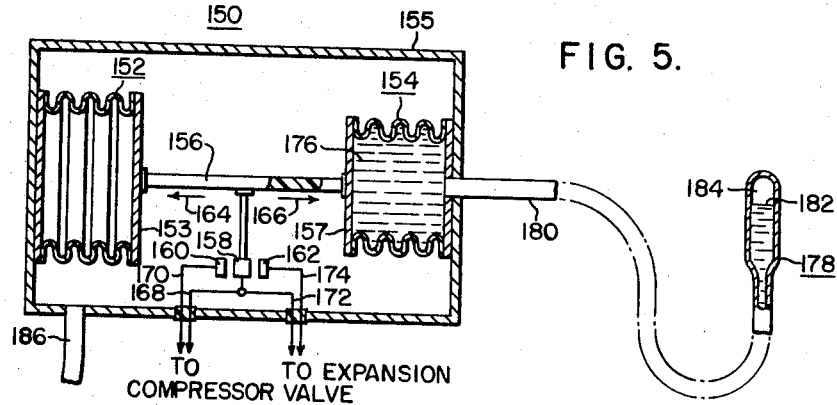
FIG. 5 is an elevational view, in section, of sensor means constructed according to another embodiment of the invention.

Electrical apparatus, such as transformers, may be efficiently cooled by spraying, flowing or otherwise distributing a vaporizable liquid over the windings, which has a boiling point within the operating temperature range of the electrical apparatus. The heat of vaporization required to vaporize the liquid is absorbed from the windings, and the vapors evolved may be condensed in external heat exchanger means, as well as on the walls of the casing or tank surrounding the electrical windings. The vaporizable liquid should be selected to have a predetermined boiling point at a predetermined pressure, and it should also be chosen for the insulating qualities of the vapor. Certain vaporizable liquids may evolve vapors which are excellent electrical insulators. Thus, the vaporizable liquid serves the dual role of cooling and insulating the windings of the electrical apparatus.

Many different vaporizable liquids possess suitable characteristics. For example, the inert fluorinated organic compounds, singly or in mixtures, are excellent. Perfluorodibutyl ether, having a boiling point of 100° C. at atmospheric pressure, or perfluorocyclic ether ($C_8F_{16}O$) having a boiling point of 101° C. at atmospheric pressure, are examples of a long list of suitable compounds. Other examples of suitable compounds which may be used in practicing this invention, either alone or in mixture, are listed in the United States Patent 2,961,476 issued Nov. 22, 1960 and assigned to the same assignee as the present application.

As hereinbefore stated, the vapors of the vaporizable liquid provide electrical insulation for the windings of the electrical apparatus. However, upon initially energizing the transformer and during periods of light loads, the temperature of the transformer is insufficient to produce a vapor pressure required for adequate electrical insulating purposes. Thus, in order to insure adequate insulation for the electrical windings for all load conditions of the apparatus, a quantity of relatively inert gaseous dielectric, which is non-condensable at all normal operating pressures and temperatures of the apparatus, is provided in the casing. The non-condensable gas may be one of the electronegative gases, such as sulfur hexafluoride ($SF_6$), nitrogen mixtures of these gases, or any other suitable gas. The general requirements of the non-condensable gas is that it be relatively inert, a good electrical insulator, and be non-condensable in the operating temperature and pressure range of the electrical apparatus. In general, all of the gases mentioned are less dense than the fluorinated organic compounds.

The insulating characteristics of suitable non-condensable gases become better as the pressure of the gas is increased. Therefore, it is desirable to subject the non-condensable gas to a relatively high predetermined pressure when the apparatus in relatively cold or at ambient temperature, and the major electrical insulation is provided by the non-condensable gas during these operating conditions. As the windings of the electrical apparatus increase in temperature with the applied load, the vapor pressure will increase and the dense vapors will force the non-condensable gas upward. As the vapor volume increases, the pressure in the tank due to the vapor would also increase. In order to prevent the tank pressure from increasing as the apparatus is loaded, and to cause the tank pressure to follow a predetermined curve to a predetermined final value when only the vapors of the vaporizable liquid will be in the tank, the non-condensable gas must be progressively removed. The final value of pressure determines the maximum temperature at which the apparatus will operate. In addition to regulating the tank pressure, it is desirable to remove the non-condensable gas from the transformer tank as its presence impedes efficient flow of the evolved vapors, making the vaporization cooling less efficient.

The disclosed invention teaches a transformer construction and sensor means associated with the transformer for accomplishing any desired predetermined operating characteristics.

Referring now to the drawings, and FIGS. 1 and 2 in particular, there is illustrated side and front elevational views, respectively, of a transformer 10 constructed according to the teachings of the invention. In general, transformer 10 includes a magnetic core and coil assembly 12 disposed within an enclosure, casing or tank 14, heat exchanger means 16 disposed in communication with the transformer tank 14, and storage means 18 disposed in communication with the heat exchanger means 16, to form a sealed or enclosed system.

More specifically, the magnetic core and coil assembly 12 includes one or more electrical windings, such as winding 20, disposed in inductive relation with a magnetic core 22. The magnetic core and coil assembly 12 may be supported within tank 14 by any suitable mounting means, such as base member 24. For the purposes of simplifying the drawing, the leads to the electrical windings and the electrical bushings normally associated with the transformer 10 are not shown. The electrical windings, such as winding 20, carry electrical current during service which develops heat within the winding 20 and magnetic core 22, which must be removed from the transformer 10.

The bottom of the tank 14 is formed to provide a sump 26 in which is disposed a predetermined quantity 28 of vaporizable liquid, such as one or more of the fluorinated organic compounds hereinbefore mentioned. The quantity of vaporizable liquid 28, as illustrated, is small compared with total volume. A conduit or pipe 30 is connected to the bottom of the sump 26 for withdrawing the liquid 28 upon the operation of a pump 32 connected to conduit 30. The liquid 28 is pumped by pump 32 through a conduit or pipe 34 to a distribution manifold 36, at which location the liquid is directed through conduits or pipes 38 to spray or flow means 40 which sprays or flows the liquid 28 over the winding 20 and magnetic core 22. The vaporizable liquid 28 distributes itself over the electrical winding 20 and magnetic core 22, and is caused to evaporate freely if these elements are hot, absorbing heat therefrom proportional to the amount of liquid vaporized and its heat of vaporization. The heat of vaporization of the fluorinated organic compounds depends upon the particular compound, and generally falls in the range of 18 to 50 calories per gram. For example, the heat of vaporization of perfluorocyclic ether ($C_8F_{16}O$) is 21 calories per gram at its atmospheric boiling temperature of 101° C.

The remaining volume of tank 14 is filled with a non-condensable gas, such as sulfur hexafluoride ($SF_6$), at a predetermined pressure above atmospheric when the transformer 10 is at ambient temperature. The total pressure within the tank 14 will be the sum of the partial pressure of the non-condensable gas, and the vapor pressure of the vaporizable coolant. At ambient temperature the vapor pressure will be small compared to that of the non-condensable gas. The pressure of the non-condensable gas must be sufficient to provide full dielectric strength for the winding insulation. Thus, when the transformer 10 is de-energized, the non-condensable gas will occupy the major volume of the tank 14, and the vapors from the liquid 28 will occupy only a small part of the volume, the division between the two being in proportion to their partial pressures.

As load is applied to the transformer 10 and the windings 20 and magnetic core 22 start to increase in temperature, the liquid 28 will be vaporized as it is flowed over the windings and core assembly 12, increasing the partial pressure in the tank due to the evolved vapors. The vapors flow to the internal walls of the tank 14, are condensed, and the condensed liquid flows back to the sump 26 for recirculation.

The total tank pressure tends to increase with load, and the more dense vapors force the non-condensable gas to rise in the tank. An outlet 42 is provided near the top of the tank for withdrawing the non-condensable gas.

Sensor means 50 is disposed at a predetermined location, preferably near the upper portion of the tank 14, for sensing the pressure and temperature within the tank at this location. The upper portion of the tank is selected as it is desirable to insure that non-condensable gas is substantially removed from the tank before the sensor becomes temperature responsive. When the sensor means 50 finally reaches the desired tank operating temperature, the tank operating pressure should be at the desired value. The function of the sensor means 50 is to control the tank pressure as the temperature of the tank changes between ambient and the desired operating temperature, and to control the tank pressure at the desired operating temperature.

The non-condensable gas is removed from the tank 14, in response to sensor means 50, through opening 42 and conduit 44. Conduit 44 is in communication with heat exchanger means 16, which may include one or more substantially vertical units, such as the heat exchanger units 46 and 48 shown in the figures. Heat exchanger means 16 may be constructed in any conventional manner, and may include means for forcing air flow over the heat exchanger means, such as fans 17. If two heat exchanger units 46 and 48 are used, as shown in the figure, the conduit 44 connects to the upper portion of the first heat exchanger unit 46 through conduit 52. The removal flow path of the non-condensable gas through the first heat exchanger unit 46 is downward, as shown by arrow 54. The bottom of the first heat exchanger unit 46 is connected to the bottom of the second heat exchanger unit 48 through conduits 56 and 58. The removal flow path through heat exchanger unit 48 is upward, as shown by arrow 60. The upper end of heat exchanger unit 48 is connected through conduits 62 and 64 to the compressor means 66 and gas storage means 18. Operation of the compressor means 66 removes the non-condensable gas from the tank 14 and heat exchanger means 16 in the direction of the arrows 54 and 60. Compressor means 66 is responsive to sensor means 50 through electrical conductors 77, 85 and 89, which are connected in circuit relation with a source of electrical potential 83.

The non-condensable gas stored in gas storage means 18 is released into heat exchanger means 16 and eventually tank 14 through an opening in the gas storage means 18 which is connected to conduit 62 at the upper end of heat exchanger unit 48 through conduit 72, expansion valve means 74, and conduit 76. Expansion valve means 74 is responsive to sensor means 50 through electrical conductors 79, 89, 87 and 81, which conductors are also connected in circuit relation with a source of electrical potential, such as source 83.

If only one heat exchanger unit were to be used, such as unit 48, the opening 42 in the upper portion of tank 14 would be connected to conduit 58 at the bottom of heat exchanger unit 48, and the remaining connections to heat exchanger unit 48 would be as hereinbefore described. Any number of heat exchanger units may be utilized, depending upon the rating of the transformer and the rating of the heat exchanger units. It is important that the heat exchanger means be connected to direct the flow of non-condensable gas-vapor mixture upward in the last heat exchanger unit, in order for the condensed vapor to flow downwardly and back to the sump 26. This accomplishes a more complete separation of vapors from the non-condensable gas. It should be noted that conduit 80 has a vaporizable liquid disposed therein, which provides a liquid seal and prevents the hot vapor from entering the heat exchanger unit 48 from the bottom portion of the tank 14.

It should also be noted that instead of connecting the heat exchanger units, such as units 46 and 48, in series, that any number of them may be connected in parallel, with the connections being as described for a single heat exchanger unit. Or, series-parallel arrangements may be used.

When the transformer 10 is deenergized, and at ambient temperature, very little vapor will be in the tank 14, and the tank 14 and heat exchanger means 16 will be filled with non-condensable gas at a predetermined pressure greater than atmospheric pressure.

When the transformer 10 is energized and liquid coolant 28 is distributed over its windings 20 and magnetic core 22, the liquid starts to vaporize and condense on the tank walls, with the less dense gas tending to concentrate in the upper portion of the tank 14, and the heavier coolant vapors tending to concentrate in the lower portion of the tank 14. The increase in the partial pressure of the vapors increases the total tank pressure which is immediately sensed by sensor means 50, which energizes compressor means 66 to start withdrawing the non-condensable gas from the heat exchanger means 16 and tank 14, to control the tank pressure along a predetermined curve.

As hereinbefore stated, the design of the sensor means 50 provides a high pressure within tank 14 when sensor means 50 is at a low temperature, such as room ambient. As the purging of the tank 14 of its non-condensable gas continues, the increasing tempearture at the location of sensor means will cooperate with the tank pressure and cause sensor means 50 to progressively reduce the tank pressure until a minimum design pressure is attained when all of the non-condensable gas is removed from the tank 14 and the maximum predetermined operating temperature in the tank 14 is attained.

As the gas-vapor dividing line within the tank 14 rises, it will eventually enter conduit 44 and heat exchanger means 16, if the load on the transformer is sufficiently high. Once the gas-vapor dividing line leaves the tank 14, the temperature and pressure within the tank 14 will be controlled to remain substantially constant for a wide range of load, and up to the design load limit as determined by the heat dissipating capacity of the heat exchanger means 16. The nature of this control may be more easily understood by imagining a fairly sharp division of the cooling area of heat exchanger means 16 into two portions. One of the portions being in contact with the hot vapors entering through conduit 52, and the remaining portion of the heat exchanger means 16 being filled with the non-condensable gas. The first portion of the heat exchanger means 16 contacted by the hot vapors will be hot, and will serve as an effective cooling surface. The second portion will be relatively cool and will take no appreciable part in cooling the transformer. The boundary line between these two portions will move the full length of the heat exchanger means, in response to the transformer heat losses, and under the control of sensor means 50. Increased load on the transformer 10 will tend to increase the tank pressure, causing sensor 50 to energize the compressor 66. The operation of compressor 66 removes some of the non-condensable gas from the cool end of the heat exchanger means 16, thus moving the gas-vapor boundary zone to expose a larger cooling area to the contact of the hot vapor. A reverse movement takes place when the load on the transformer is reduced. Thus, for a predetermined load range, when the gas-vapor dividing zone remains within the coolers the sensor means 50 will serve to adjust the cooling rate of the heat exchanger means 16, through the movement of the gas-vapor zone, to meet the demand imposed by the load. Under this operating condition the tank pressure and, therefore, the tank temperature, will remain substantially constant, regardless of the load, the temperature being equal to the boiling point of the vaporizable liquid at the operating pressure. Under this operating condition, the temperature in the tank 14 being constant, sensor means 50 will operate only in response to pressure, maintaining the tank pressure at substantially the predetermined design value.

At light loads, when the gas-vapor dividing line is within the tank 14, very little vapor will escape the tank 14 through the outlet 42, and the vapor will condense on the tank walls and flow to the sump 26. At higher loads the gas-vapor dividing zone will enter the heat exchanger means 16 and the vapor will be condensed in the heat exchanger means 16, as well as on the tank walls, flowing from the bottom of heat exchanger means 16 through conduit 80. When the gas-vapor dividing zone is within heat exchanger unit 46, the vapor condensing in this unit will flow downwardly to conduits 56 and 80 back to the sump 26. When the gas-vapor dividing zone is located in heat exchanger unit 48, the vapor condensing in this unit will run back into the sump 26.

When the load on transformer 10 drops below a predetermined minimum, the gas-vapor dividing zone will move back into the tank 14, and sensor 50 will again be pressure and temperature responsive, causing the transformer tank pressure to retrace the original pressure curve until, when it is at ambient temperature, the tank will be back to its original pressure and again substantially filled with the non-condensable gas.

An example of the desired operating characteristics of transformer 10 is shown in FIG. 3. FIG. 3 is a graph in which the tank pressure in p.s.i.a. is plotted against tank temperature, starting at an ambient temperature which is selected to be 25° C. and terminating at the desired operating temperature of the transformer which, for purposes of this example, is 100° C. The total tank pressure ($P_T$) is indicated by curve 82, the partial tank pressure due to the vapor ($P_V$) is indicated by curve 84, and the partial tank pressure due to the non-condensable gas ($P_G$) is indicated by curve 86. Assuming, for purposes of example, that the non-condensable gas is sulphur hexafluoride ($SF_6$) and the vaporizable liquid 28 is perfluorocyclic ether ($C_8F_{16}O$), it would be desirable to have the $SF_6$ under a pressure of 45 p.s.i.a. at ambient temperature in order to increase its electrical strength, and it would be desirable to reduce the pressure to 15 p.s.i.a. or atmospheric at the desired operating temperature. The electrical strength of the liquid vapors are excellent at atmospheric pressure, and the transformer operating temperature will be inherently limited to the boiling point (101° C.) of the $C_8F_{16}O$. As shown in FIG. 3, at ambient temperature the vapor pressure $P_V$ is very low, with the pressure of the $SF_6$ making up substantially the total tank pressure. As the tank temperature increases, the vapor pressure $P_V$ increases, and the non-condensable gas pressure $P_G$ should be reduced to trace the desired total tank pressure curve 82. At operating temperature, the tank pressure $P_T$ and vapor pressure $P_V$ are substantially the same, and the non-condensable gas pressure $P_G$ will be substantially zero.

It is the function of sensor means 50 to operate the compressor means 66 and expansion valve 74 to reproduce the curves shown in FIG. 3, or any other desirable curves, depending upon the particular vaporizable liquid, noncondensable gas and transformer operating characteristics required.

One embodiment of the sensor means 50 for providing the desired control is shown in detail in FIG. 4. FIG. 4 is an elevational view, in section, of sensor means 50, which is essentially a relay having movable contact means 90 and first and second stationary contact means 92 and 94, respectively. The movable contact means 90 is connected to be responsive to means 96, which may be a rigid rod member disposed between first and second pressure responsive means such as bellows 98 and 100, respectively. Bellows 98 includes an expandable and contractible side member 102 disposed between end members 106 and 108, respectively. Bellows 100 includes a side member 104 disposed between first and second end members 110 and 112, respectively. Side members 102 and 104 of bellows means 98 and 100 are constructed to allow the bellows to expand and contract in response to pressure on end members 108 and 110, with expansion and contraction being in a direction perpendicular to end plates 108 and 110. End plates 108 and 110 determine the pressure areas or bases for bellows 98 and 100, respectively.

Bellows 98 and 100 are coaxially disposed in spaced relation on an axis parallel to their directions of expansion and contraction, and their end members 106 and 112, respectively, may be secured to a suitable mounting means 114. Mounting means 114, which supports the bellows 98 and 100 in the desired fixed spaced relation, may be mounted within the tank 14 by any suitable means, such as brackets 116 and 118. Rod member 96 is disposed between the pressure bases 108 and 110 in a substantially perpendicular manner and suitably attached thereto. Mounting means 114 should have suitable openings therein, such as openings 120 and 122, in order to allow the bellow means 98 and 100 to be responsive to the pressure and temperature conditions existing within the casing at the location of sensor means 50. As shown in FIGS. 1 and 4, sensor means 50 is preferably disposed within the tank 14 near the upper portion of the tank.

In order to control the pressure of the tank 14 according to the particular conditions existing within the tank, bellows 98 has a non-condensable gas disposed therein, preferably at a pressure substantially equal to the pressure of the non-condensable gas disposed within tank 14 at ambient temperature. Thus, in the example shown in FIG. 3, the noncondensable gas in bellows 98 would be at a pressure of 45 p.s.i.a., the same as the pressure of the non-condensable gas in tank 14 at ambient temperature.

The particular non-condensable gas used in bellows 98 may be the same as the non-condensable gas in tank 14. However, since gases follow the same pressure versus temperature curve, the gas in bellows 98 may be any other suitable non-condensable gas.

Bellows 100 has a non-condensable gas disposed therein, preferably at the same pressure as the non-condensable gas disposed in the tank 12 at ambient temperature, and a quantity 124 vaporizable liquid. Since vaporizable liquids do not all have the same vapor pressure versus temperature characteristic, it is preferable to use the same vaporizable liquid in bellows 100 as used in tank 14, or at least one having a similar vapor pressure versus temperature characteristic.

The remaining variable to be selected is the ratio of the area of the pressure base 108 of bellows 98 to the area of the pressure base 110 of bellows 100. This ratio is selected to provide equal and opposite forces on rod member 96 when the pressure-temperature conditions conform to those shown in FIG. 3. The condition for balance or equilibrium of rod 96 and hence the movable contact 90 may be stated as follows:

(1) $$(P_{G1}-P_T)A_1=(P_{G2}+P_V-P_T)A_2$$

(2) $$(P_{G1}-P_T)\frac{A_1}{A_2}=P_{G2}+P_V-P_T$$

(3) $$(P_{G1}-P_T)a=P_{G2}+P_V-P_T$$

In the above equations, $P_{G1}$ is equal to the pressure of the non-condensable gas in bellows 98, $P_{G2}$ is equal to the pressure of the non-condensable gas in bellows 100, $P_V$ is equal to the vapor pressure in the bellows 100, $P_T$ is equal to the total pressure in tank 14, $A_1$ is equal to the area of the pressure base 108 of bellows 98, $A_2$ is equal to the area of the pressure base 110 of bellows 100, and $a$ is equal to the ratio of $A_1/A_2$. $P_{G1}$ may be equal to the $P_{G2}$, as hereinbefore indicated as preferable, but it is not essential, and may be selected to be any other desirable value, with the ratio of the pressure bases being selected accordingly.

Assuming that the operating conditions for transformer 10 are as shown in the graph of FIG. 3, $P_T$ would equal 45 p.s.i.a. and $P_V$ would be substantially zero for a first condition, i.e., at the ambient temperature of 25° C., and $P_T$ would be equal to 15 p.s.i.a. and $P_V$ would be equal to 15 p.s.i.a. for a second condition, i.e., when the transformer is at the desired operating temperature of 100° C. Substituting the first condition into Equation 3 the following is obtained:

(4) $\quad aP_{G1} - 45a = P_{G2} - 45$

Substituting the second condition into Equation 3 obtains the following equation:

(5) $\quad aP_{G1} - 15a = P_{G2} + 15 - 15$

Subtracting Equation 5 from Equation 4 obtains the following:

(6) $\quad -30a = -45$ or $$a = \frac{3}{2} = \frac{A_1}{A_2}$$

Thus, for the conditions illustrated in FIG. 3, the required ratio of the area of the pressure base 108 of bellows 98 to the area of the pressure plate 110 of bellows 100 should be 3/2. Using $a = 3/2$ in Equation 5 obtains the following:

(7) $\quad \dfrac{3P_{G1}}{2} - \dfrac{(15)(3)}{2} = P_{G2}$ or (8) $\quad 3P_{G1} - 45 = 2P_{G2}$ Assuming $P_{G1} = P_{G2} = P_G$, where $P_G$ is equal to the pressure of the non-condensable gas in tank 14 at ambient temperature, Equation 8 becomes:

(9) $\quad P_G = 45$ p.s.i.a.

Thus, with the specific values of $$a = \frac{A_1}{A_2} = \frac{3}{2}$$

and $P_G = 45$ p.s.i.a., Equation 1 becomes:

(10) $\quad 3(45 - P_T) = 2(45 + P_V - P_T)$ or

(11) $\quad P_T = 45 - 2P_V$

Equation 11 conforms exactly to the curves shown in FIG. 3.

The total tank pressure $P_T$ may be made to operate along any desired curve, merely by preselecting the ratio of the pressure areas of the bellows 98 and 100. To illustrate that the curve represented by Equation 11 will change for different selected operating conditions, assume an initial or ambient condition of $P_T$ equal to 45 p.s.i.a. and $P_V$ equal to zero, and an operating condition of $P_V$ equal to 20 p.s.i.a. and $P_T$ equal to 20 p.s.i.a. This will provide 5 p.s.i.g. in the tank 14 at the operating point, which will provide a slightly higher operating temperature, and a higher dielectric strength for the vapors.

Assuming $P_{G1} = P_{G2} = P_G$, the general equation is:

(12) $\quad a(P_G - P_T) = P_G + P_V - P_T$

Substituting the ambient conditions into Equation 12 obtains:

(13) $\quad a(P_G - 45) = (P_G - 45)$ or

(14) $\quad (a - 1)P_G = (a - 1)45$ or

(15) $\quad P_G = 45$

Substituting the pressure $P_G = 45$ and the desired operating conditions into Equation 12 obtains:

(16) $\quad a(45 - 20) = 45 + 20 - 20$

(17) $\quad a = \dfrac{45}{25} = 1.8$

Thus, for this example, the ratio of $A_1/A_2$ is equal to 1.8 instead of 1.5, and the final equation of the curves for the operating conditions in the last example obtains:

(18) $\quad 1.8(45 - P_T) = 45 + P_V - P_T$ or

(19) $\quad P_T = 45 - 1.25 P_V$

With the sensor means 50 disposed within the transformer tank 14, there will be an appreciable temperature effect on the gas pressure in bellows 98 and 100, which was neglected in the above equations. However, it can be shown that the temperature effect on the pressure of the gas in the bellows may be compensated for by the proper choice of the ratio of the areas of the pressure bases 108 and 110 of bellows 98 and 100.

For example, using the conditions shown in the graph of FIG. 3, and neglecting the effect of the tank temperature on the gases in the bellows 98 and 100, the ratio of $A_1/A_2$ was equal to 3/2. If the temperature effect on the gas pressure in the bellows is considered, and the bellows gas pressure $P_G$ is defined at 25° C. and at another temperature $\theta$° C., since the pressure of a gas at constant volume is proportional to its absolute temperature, the pressure of the gas in the bellows at $\theta$° C. ($P_{GT}$) will be equal to:

(20)

$$P_{GT} = P_G \frac{(273 + \theta)}{273 + 25} = P_G \frac{298 + (\theta - 25)}{298} = P_G\left(1 + \frac{1}{298}(\theta - 25)\right)$$

Letting $1/298 = \alpha$ and $(\theta - 25)$ equal $\Delta\theta$ we obtain:

(21) $\quad P_{GT} = P_G(1 + \alpha\Delta\theta)$

The general equation, taking into consideration the effect of the tank temperature on the gas pressure in the bellows is:

(22) $\quad A_1(P_{GT} - P_T) = A_2(P_{GT} + P_V - P_T)$

Substituting the value of $P_{GT}$ obtained in Equation 21 into Equation 22 we obtain:

(23)

$$\frac{A_1}{A_2}[P_G(1 + \alpha\Delta\theta) = P_T] = P_G(1 + \alpha\Delta\theta) + P_V - P_T$$

or

(24) $\quad a[P_G(1 + \alpha\Delta\theta) - P_T] = P_G(1 + \alpha\Delta\theta) + P_V - P_T$ Solving Equation 24 for $P_G$ at 25° C., at which temperature $\Delta\theta$ is equal to 0 we obtain:

(25) $\quad a(P_G - 45) = P_G + 0 - 45$ or

(26) $\quad (a - 1)P_G = (a - 1)45$ or

(27) $\quad P_G = 45$ p.s.i.a.

At 100° C. the relationship $1 + \alpha\Delta\theta$ is equal to $$1 + 75/298 = 1.25$$

Solving Equation 24 with the relationship $1 + \alpha\Delta\theta = 1.25$ and $P_T = 15$ p.s.i.a. we obtain:

(28) $\quad a[(45)(1.25) - 15] = (45)(1.25) + 15 - 15$ or

(29) $\quad a = \dfrac{(45)(1.25)}{(45)(1.25) - 15} = \dfrac{56}{41} = 1.37 = \dfrac{A_1}{A_2}$ Thus, instead of the ratio $A_1/A_2$ being equal to 1.5, when the temperature affect on the bellows 90 and 100 was neglected, the ratio is found to be 1.37 when the temperature effect on the gas in the bellows is considered.

The operation of sensor means 50 shown in FIG. 4, disposed in the transformer 10 as shown in FIG. 1, will now be described using the operating parameters shown in the chart of FIG. 3.

When the transformer 10 is deenergized, the vapor pressure in tank 14 and bellows 100 will be substantially zero and the pressure of the non-condensable gas in bellows 98 and 100 will be the same as the pressure of the non-condensable gas in the tank 14. Therefore, bellows 98 and 100 will be in equilibrium, with the internal pressure in the bellows being the same as the external pressure. Contact means 90, which is responsive to any movement of the bellows 98 and 100 through rod member 96, will be between the stationary contacts 92 and 94.

When transformer 10 is energized, the liquid 28 will be distributed over the windings 20 and magnetic core 22, increasing the partial pressure of the vapor in the tank 14 and increasing the total tank pressure. Since the vapor is more dense than the non-condensable gas in tank 14, it will be substantially confined to the lower portion of the tank and tis higher temperature will not affect sensor means 50, at least initially. Thus, as the transformer winding and core assembly 12 generates heat, the initial affect on sensor means 50 will be due mostly to the increase in total tank pressure. Since bellows 98 has a larger pressure area than bellows 100, the slight increase in total tank pressure produces an unbalance of force in the direction of arrow 130 in FIG. 4, compressing bellows 98 and causing movable contact 90 to engage stationary contact 92 and energize compressor means 66. The compressor means 66 will withdraw non-condensable gas from the heat exchanger means 16 and tank 14 until the tank pressure is reduced to the point where the pressure in bellows 98 will expand bellows 98 to return the movable contact means 92 to equilibrium and deenergize compressor means 66. Compressor means 66 will be intermittently operated, due to the increasing partial pressure of the vapor, as the transformer winding and core assembly 12 continues to heat, removing more and more of the non-condensable gas from the tank 14 and heat exchanger means 16. As the dividing zone between the gas and vapor within tank 14 moves upward, a point is reached where sensor means 50 will be affected by the temperature of the vapor, which increases the vapor pressure of the vaporizable liquid 124 disposed in bellows 100. The increased pressure in bellows 100 produces an unbalance of force in the direction of arrow 130, energizing the compressor means 66 and removing still more non-condensable gas from heat exchanger means 16 and tank 14. Once sensor means 50 is heated by vapor in tank 14, the removal of noncondensable gas from the system to the storage means will be responsive to both the pressure and temperature in the tank 14.

As the load on transformer 10 increases, compressor means 16 will be intermittently operated to reduce the total tank pressure along curve 82 shown in FIG. 3, until the non-condensable gas has been removed from tank 14 and the gas-vapor dividing zone has moved into heat exchanger means 16. The pressure in the tank 14 will then be equal to the vapor pressure alone, and the tank temperature will be limited to the boiling point of the vaporizable liquid at the particular vapor pressure. The vapor pressure in bellows 100 will reach a steady value once the temperature in bellows 100 equals the temperature of the vapor in tank 14, and sensor means 50 will once again be only pressure responsive. Any increase in pressure in tank 14 from the desired operating pressure will result in operation of compressor means 16 and removal of more non-condensable gas from heat exchanger means 16, thus changing the position of the gas-vapor dividing zone within the heat exchanger means 16. The heat exchanger means 16 is selected to maintain the gas-vapor dividing zone within the heat exchanger means for the heaviest overload which will be appleid to transformer 10.

If the pressure in tank 14 drops due to a reduction in load and, therefore, the reduction in the heating of the transformer winding and core assembly 12, a greater force will be applied to rod 96 by the internal pressure of bellows 98 than will be applied to rod 96 by the internal pressure of bellows 100, producing an unbalance in the direction of arrow 132 which closes contacts 90 and 94 and opens expansion valve means 74. Non-condensable gas is allowed to re-enter the heat exchanger means from storage tank 18 through conduits 72, 76 and 62 until the pressure within tank 14 is sufficient to again balance the bellows 98 and 100, opening contacts 90 and 94, and closing the expansion valve means 74.

Thus, once the operating pressure and temperature is reached, indicated by point 99 on the graph of FIG. 3, these operating conditions will be maintained for as long as the gas-vapor dividing zone stays within the heat exchanger means 16. When the transformer load is reduced to a point where the gas-vapor zone again enters tank 14, the temperature of sensor means 50 will start to drop and the sensor means will increase the tank pressure in response to both the reducing vapor pressure in the tank 14 and, due to the reducing temperature in the tank, to return the tank pressure $P_T$ from the operating value at point 99 along curve 82 and back to its starting point when the transformer load is completely removed.

In the embodiment of sensor means 50 shown in FIG. 4, sensor means 50 was disposed within the transformer casing 14, with only electrical conductors 77, 79 and 81 being brought through the tank wall. This has the advantage of minimizing the danger of gas leak at the bellows joints and gaskets. A disadvantage of this arrangement is that the sensor means is not readily accessible for adjustments and maintenance. Thus, in some applications it may be desirable to dispose the sensor means external to the transformer tank 14, and FIGS. 5 and 6 illustrate additional embodiments of sensor means wherein it will operate external to the tank 14.

Figure 6:
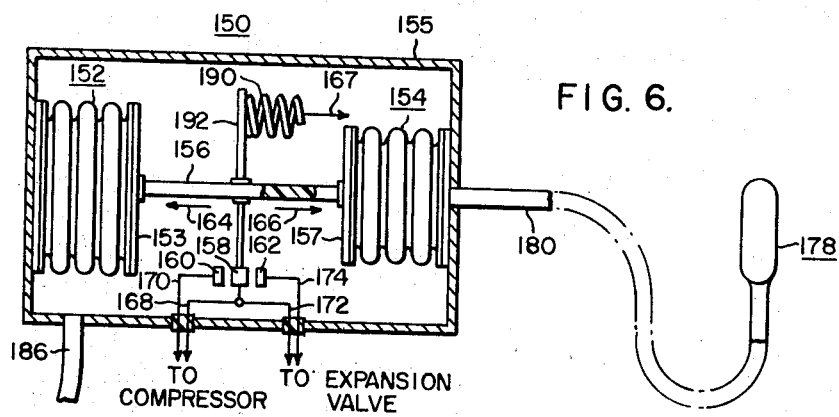
FIG. 6 is an elevational view, in section, of sensor means constructed according to still another embodiment of the invention.

FIG. 5 illustrates an elevational view, in section, of a sensor means 150 constructed according to another embodiment of the invention. In this embodiment the first and second pressure responsive means which translate pressure changes into axial movement, such as sylphon bellows 152 and 154, respectively, are coaxially disposed within a sealed housing, enclosure or casing 155 and interconnected with a rod member 156 between the pressure bases 153 and 157. Rod member 156 carries or otherwise actuates a movable contact member 158. First and second stationary contacts 160 and 162 are disposed such that the movable contact 158 will engage stationary contact 160 when rod member 156 moves in the direction of arrow 164, and stationary contact 162 when rod member 156 moves in the direction of arrow 166. Electrical conductors 168 and 170 are connected to the movable contact 158 and first stationary contact 160, and extend through the enclosure 155 in sealed relation for connection to a suitable source of potential and with the compressor means 66 of FIG. 1. Electrical conductors 172 and 174 are connected to the movable contact 158 and a second stationary contact 166, and extend through casing or enclosure 155 in sealed relation for connecting expansion valve means 74 with a suitable source of potential. Like bellows 98 shown in FIG. 4, bellows 152 is filled with any suitable non-condensable gas. Bellows 154, however, is completely filled with a vaporizable liquid 176, which may be the same as the vaporizable liquid 28 disposed in transformer 10, or one having similar vapor pressure versus temperature characteristics. Bellows 154 is connected to means for translating temperature change within tank 14 at a predetermined location to pressure change, such as bulb 178 which is connected to bellows 154 through a capillary tube 180. The bulb 178 and capillary tube 180 also contains the vaporizable liquid 176, with the bulb 178 being filled to a predetermined level 182, which leaves a space 184 for the formation of vapor and expansion of the liquid 176 when bellows 154 contracts.

The sealed enclosure 155 is made responsive to the pressure within tank 14 of transformer 10 through any suitable means, such as capillary tube 186 which communicates between the inside of enclosure 155 and the inside of tank 14. The bulb 178 is disposed within the transformer tank 14 at a predetermined location, preferably near the top of the tank 14. Bellows 154 is thus responsive to the temperature of the transformer tank at the location of the bulb. The basic equation for balance of forces in sensor 150 is:

(30) $$(P_G - P_T)A_1 = (P_V - P_T)A_2$$

or

(31) $$(P_G - P_T)a = P_V - P_T$$

Where $P_G$ is the pressure of the gas in bellows 152, $P_T$ is the pressure within tank 14 and the pressure within enclosure 155, $A_1$ is the area of pressure base 153 of bellows 152, $P_V$ is the vapor pressure in the transformer tank 14 and the pressure in bulb 178 in bellows 154, and $A_2$ is the area of the pressure base 157 of bellows 154. Solving Equation 31 for $P_T$ obtains:

(32) $$P_T = \frac{P_V - aP_G}{1-a}$$

Using the ratio $$\frac{A_1}{A_2} = \frac{3}{2}$$

Equation 32 becomes:

(33) $$P_T = 3P_G - 2P_V$$

Thus, the curve $P_T = 45 - 2P_V$ developed in Equation 11 may be obtained for sensor means 150 by selecting the pressure $P_G$ in bellows 152 to be 15 p.s.i.a., which when substituted in Equation 33 obtains:

(34) $$P_T = 45 - 2P_V$$

The operation of the sensor means 150 shown in FIG. 5 may be affected slightly by changes in the ambient temperature surrounding the sensor because of the affect of ambient temperature on the pressure of the non-condensable gas in bellows 152. If the ambient temperature may vary widely, it may be advantageous to seal bellows 153 under a vacuum. This embodiment of sensor means 150 is shown in FIG. 6, with like reference numerals in FIGS. 5 and 6 referring to like components. The construction of the sensor 150 in FIGS. 5 and 6 is similar, except for evacuating bellows 152 instead of filling it with a non-condensable gas at a predetermined pressure.

In FIG. 6, in order to provide the necessary balance of forces on rod member 156, a static force of predetermined value may be applied axially to rod member 156, such as by spring means 190, which applies a predetermined force to rod member 156 in the direction of arrow 167. The force may be applied to rod member 156 through any suitable means, such as member 192 disposed to transmit the force of spring member 190 into the rod 156 in an axial manner. As an alternate arrangement, the compression spring 90 may be axially disposed inside bellows 152.

The required force applied by the spring 190 which may be called $S_F$ is equal to the pressure in the tank ($P_T$) times the difference in the areas of the pressure bases 153 and 157 of bellows 152 and 154, respectively, which may be written:

(35) $$S_F = P_T(A_1 - A_2)$$

Figure 7:
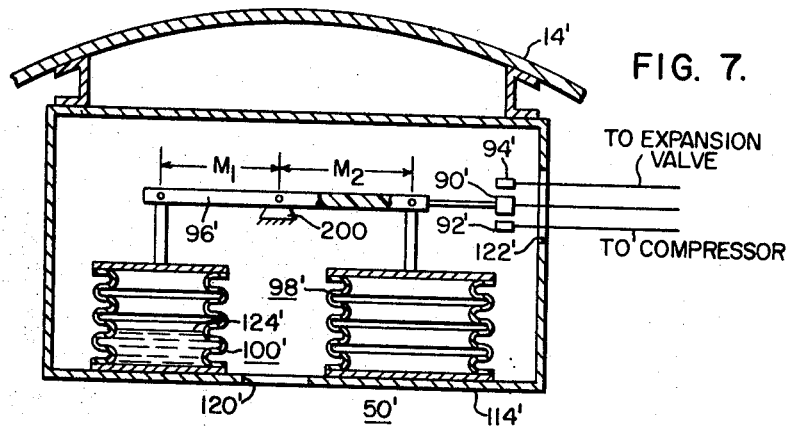
FIG. 7 is an elevational view, in section, of sensor means constructed according to another embodiment of the invention.

While the embodiments of the sensor means hereinbefore described have all used coaxially disposed bellows, it is to be understood that the invention is not to be limited to this arrangement. For example, the two bellows in any of the hereinbefore described embodiments may be disposed in spaced side-by-side relation with their axes parallel. The bellows may be connected to opposite ends of a rod member, which is pivotally secured at a predetermined point. When the moments applied to the rod member by the two bellows are equal, the rod member would be in equilibrium. When the moments are not equal, the rod would pivot with the direction of the pivot being determined by the larger of the moments. A pivot in one direction would close electrical contacts for energizing the compressor, and a pivot in the opposite direction would close electrical contacts for opening the expansion valve. This arrangement is shown in FIG. 7, using the same reference numerals as in FIG. 4, except with a prime mark, to illustrate like components.

The moment of the force provided by bellows 100' is equal to the force applied to rod member 96' times the distance $M_1$ from the point on the rod member 96' that the force is applied to pivot point 200. In like manner, the moment of the force provided by bellows 98' would be equal to the force applied to rod member 96' times the distance $M_2$. For equilibrium, the two moments would have to be equal. Therefore, in this embodiment, the pressure areas of bellows 98' and 100' may be equal, with the ratio of the moment arms $M_1$ and $M_2$ being predetermined to provide a predetermined pressure versus temperature relationship. Or, as shown in FIG. 7, the moment arms $M_1$ and $M_2$ may be equal, with the ratio of the pressure areas being selected to provide the desired pressure-temperature relationship. Or the moment arms $M_1$ and $M_2$ may be unequal in length, and the pressure areas of the bellows 98' and 100' may be unequal, as long as they have a predetermined relationship.

Further, the mechanical contact arrangement shown and described is for purposes of illustration only. Any other means for developing signals for the compressor and expansion valve in response to unbalance between the two bellows may be used. For example, the signals may be developed electrically. The forces exerted by the two bellows may be translated into electrical signals which may be compared in error detecting means. A balance of forces would provide equal electrical signals and hence no "error" signal. An unbalance of forces in one direction would produce an error signal of a first polarity, which polarity would activate a first static switching means connected to a source of potential and the compressor. An unbalance of forces in the opposite direction would produce an error signal of opposite polarity, which polarity would actuate a second static switch means connected to a source of potential and the expansion valve.

In summary, there has been disclosed a new and improved arrangement in which gas insulated, vaporization cooled electrical apparatus may be made to operate along a predetermined curve of total tank pressure versus temperature to utilize the non-condensable insulating gas at high pressure, and removing and replacing this gas with a condensable vapor while lowering the tank pressure, taking advantage of the fact that the condensable vapors have a higher dielectric strength than the gas at the lower pressures. Thus, a highly efficient gaseous insulation is provided under all operating conditions while simultaneously achieving highly efficient vaporization-condensation cooling at higher loads. Further sensor means have been disclosed which are responsive to the pressure and temperature to provide the desired temperature and pressure relationship. Sensor or control means operates compressor means and expansion valve means in response to the temperature in the tank of the apparatus at a predetermined point, and to the tank pressure, to control the total tank pressure. First and second pressure and temperature responsive means having a predetermined ratio of pressure responsive surfaces or areas such as sylphon bellows or diaphragms, are used to actuate or close electrical contacts in response to an unbalance in forces between the first and second pressure responsive means. The electrical contacts operate compressor means and expansion valve means in response to the intelligence received from the sensor means.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. An electrical transformer comprising a casing; electrical windings disposed within said casing; a quantity of liquid vaporizable at a temperature within the operating temperature range of said windings; said liquid being disposed in said casing; means applying said liquid to said electrical windings, cooling them by evaporation of the liquid into a condensable electrical insulating vapor; a non-condensable electrical insulating gas disposed in said casing; heat exchanger means; gas storage means; compressor means; valve means; means connecting said heat exchanger means with said casing; means connecting said heat exchanger means with said gas storage means through said compressor means; means connecting said heat exchanger means with said gas storage means through said valve means; sensor means responsive to pressure and temperature conditions within said casing at a predetermined location; means for energizing said compressor means in response to a signal from said sensor means to store non-condensable gas in said gas storage means; means for opening said valve means in response to a signal from said sensor means to release non-condensable gas from said storage means; said sensor means controlling the pressure in said casing in a predetermined manner over the operating temperature range of the electrical transformer to provide a predetermined electrical insulating level around said electrical windings.

2. The electrical transformer of claim 1 wherein said sensor means includes first and second pressure responsive means, each having a predetermined pressure responsive area, said second pressure responsive means also being responsive to the temperature at a predetermined location in said casing, said first and second responsive means translating changes of pressure and temperature in the casing to signals for the means for energizing said compressor means and the means for opening said valve means, the ratio of the pressure areas of the first and second pressure responsive means determining the pressure versus temperature curve over the operating temperature range of the transformer.

3. The electrical transformer of claim 2 wherein said first and second pressure responsive means are first and second bellows, respectively, and including means disposed to be responsive to movement of the pressure areas of said first and second bellows for translating the movement into signals for said means for energizing said compressor means and said means for opening said valve means.

4. The electrical transformer of claim 3 wherein said sensor means is disposed within said casing at a predetermined location, said first bellows containing a non-condensable gas, and said second bellows containing a non-condensable gas and a quantity of vaporizable liquid.

5. The electrical transformer of claim 3 wherein said sensor means is disposed external to said casing, a sealed enclosure surrounding said first and second bellows, means subjecting the first and second bellows in said sealed enclosure to the pressure within said casing, said first bellows containing a non-condensable gas, and means for making the internal pressure of said second bellows responsive to the temperature at a predetermined location within said casing.

6. The electrical transformer of claim 3 wherein said sensor means is disposed external to said casing, a sealed enclosure surrounding said first and second bellows, means subjecting the first and second bellows in said sealed enclosure to the pressure within said casing, said first bellows being substantially evacuated, means for making the internal pressure of said second bellows responsive to the temperature at a predetermined location in said casing, and means applying a force to the pressure area of said first bellows in a direction tending to expand the bellows, said force being equal to the pressure in said sealed enclosure at a predetermined temperature times the difference between the pressure areas of said first and second bellows.

7. An electrical transformer comprising a casing; a magnetic core; electrical windings disposed in inductive relation with said magnetic core; said electrical windings and magnetic core being disposed within said casing; a quantity of liquid vaporizable within the operating temperature range of said electrical windings; said liquid being disposed in said casing; said liquid being distributed over said electrical windings, cooling said electrical windings by evaporation of said liquid into a condensable electrical insulating vapor; a non-condensable electrical insulating gas disposed in said casing; heat exchanger means disposed in communication with the non-condensable gas and the vapor in said casing; gas storage means; first means for removing non-condensable gas from said heat exchanger means and disposing it in said gas storage means; second means for allowing non-condensable gas in said gas storage mean to return to said heat exchanger means; third means controlling said first and second means in response to the pressure and temperature at a predetermined location in said casing; said third means providing a predetermined pressure versus temperature relationship in said casing over the operating temperature range of the transformer, while maintaining a substantially uniform electrical insulating strength around said electrical windings.

8. The electrical transformer of claim 7 wherein said first means includes a compressor, and said second means includes an expansion valve.

9. The electrical transformer of claim 7 wherein said third means includes first and second pressure responsive means, each having a predetermined pressure responsive area, said first and second pressure responsive means being responsive to the pressure within said casing, said second pressure responsive means also being responsive to the temperature at a predetermined location within said casing, the ratio of the pressure areas of said first and second pressure responsive means determining the pressure versus temperature relationship of the transformer over its operating temperature range.

References Cited

UNITED STATES PATENTS 2,961,476   11/1960   Maslin et al. _____ 174—15

LEWIS H. MYERS, *Primary Examiner.*

D. A. TONE, *Assistant Examiner.*